July 18, 1972  L. R. O'HARE  3,677,931
CORONA CELL FOR NITROGEN AND OTHER REACTIONS
Filed March 30, 1970
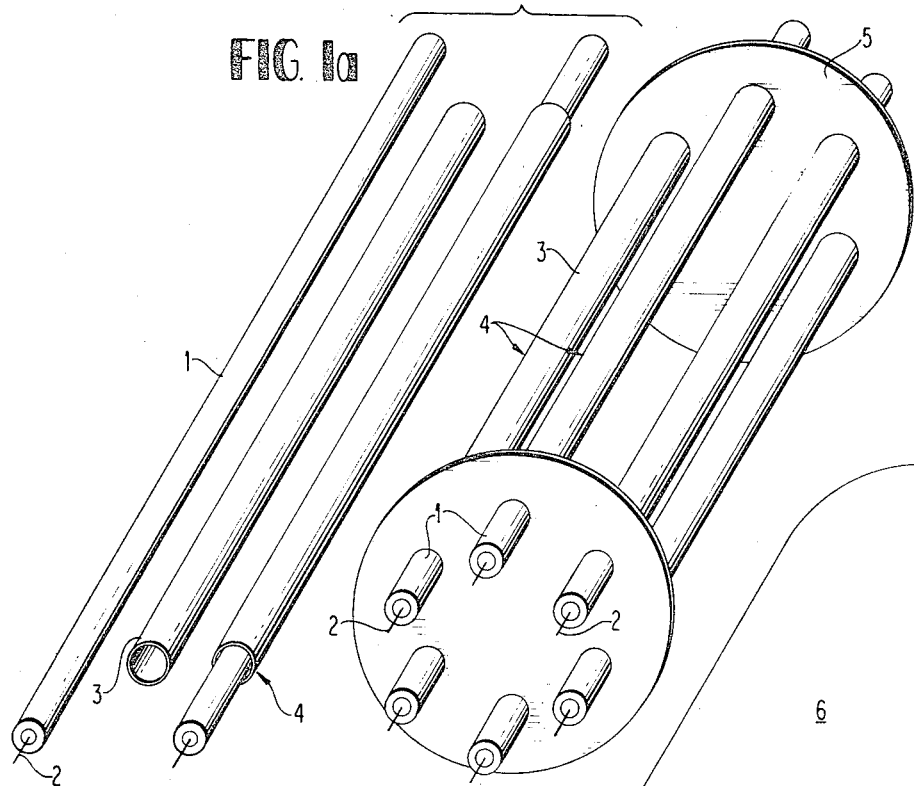
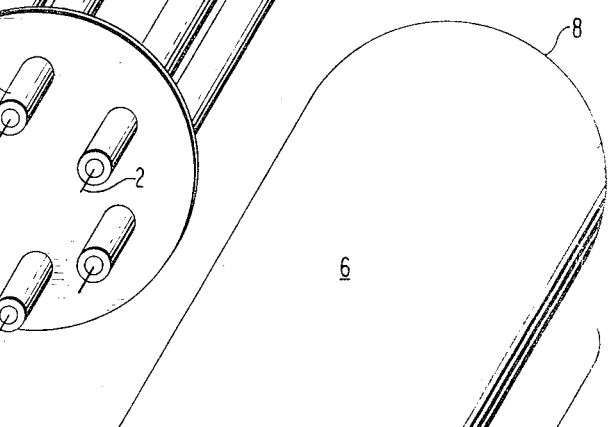
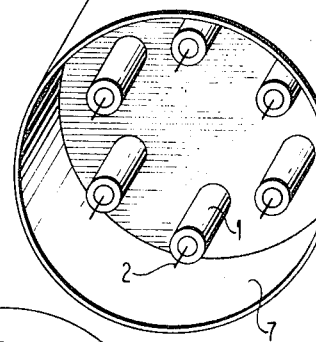
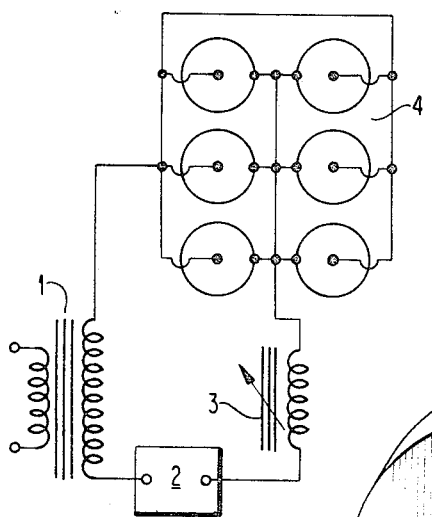
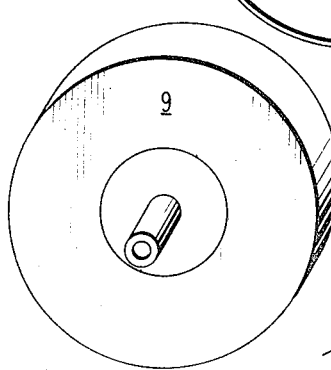
INVENTOR
Louis Richard O'Hare

United States Patent Office

3,677,931
Patented July 18, 1972

3,677,931
CORONA CELL FOR NITROGEN AND OTHER REACTIONS
Louis Richard O'Hare, 2700 Indiana NE.,
Albuquerque, N. Mex. 87110
Filed Mar. 30, 1970, Ser. No. 33,831
Int. Cl. B01k 1/00
U.S. Cl. 204—312
3 Claims

ABSTRACT OF THE DISCLOSURE

A concentric-electrode type of electric chemical reactor cell using high voltages of A.C. current between a central wire and an outer insulated metallic cylinder, such as in an ozone generator, is adapted for achieving higher energy gas state chemical reactions by the use of higher voltages and fields thereby producing chemically reactive ionized species which are unattainable and undesirable from the standard ozone generator. The A.C. voltage between the electrodes is provided with a D.C. bias of such amplitude as to insure periods of time when there is a greater number of ions in the cell having a charge that is of the same electric sign as the sign on the central ionizing wire for the chemical advantage of reacting that ionized species when the reacting species is more chemically reactive in its ionized form than in its electrically neutral form, and finally the capacitive reactance of the cell is made part of a resonant circuit with the secondary of the current supply transformer to insure a favorable power factor and efficient operation.

---

This invention relates to methods of and apparatus for reacting chemicals in their gaseous state or vapor state by means of producing electrically charged ions which are electrical states of atoms and molecules which in many cases are chemically more reactive than in the non-ionized state.

In accordance with the invention chemical elements or molecules in their gaseous or vapor state are transported under pressure through a number of very narrow ducts which ducts run through the center of highly electrically insulating and chemically inert cylindrical tubes. Very fine wires in electrical contact with the gases and vapors are connected through the center of these ducts. Around the circumference of each tube at a suitable distance is located an electrically conducting shield so connected electrically as to create electrical capacitance after the manner of an electric condenser between the inner wire and the shield as well as between the gas or vapor to be ionized in the duct and the outer shield and thereby being arranged that an electrostatic field can be produced between the conductive elements.

Further in accordance with this invention and more specifically two electrical currents are placed across the above electrically conductive elements. That is to say a potential of alternating current with a direct current bias is applied across the inner wire and the outer shield in the manner a condenser might be connected across the output of an A.C. generator and a D.C. battery connected in series. The relationship of the A.C. voltage to the electrical capacitance existing between the inner wire and the outer shield is such that the capacitive reactance of the circuit allows current to flow back and forth in the form of voltage-amperage-reactive called "wattless" power. But since the voltage is high, in the order of ten kilovolts or more, ionization of some gas or vapor occurs on the wire. At this point more current can flow in the A.C. capacitive reactive circuit because the capacitance of the condenser has increased and the capacitive reactance has decreased. This is true because the "plates" of the condenser have increased in size i.e. the value of the capacitance is no longer determined by the size of the very fine electrical wire in the center of the duct and the outer shield but now by the size of the electrically conducting duct with its conducting ions and the outer shield. Also the distance of separation of the condenser "plates" has decreased by this mechanism because at every point the outer circumference of the same conducting duct is closer to the shield than was the wire in the center of the duct. Consequently this mechanism causes increased capacitance and voltage-amperage-reactive current. As the ions are alternately charged to one polarity and then another they return their charges to the circuit the same way that the plate of a condenser returns its charge to the current flowing back and forth in a wattless power circuit. In this way many ions can be formed and react chemically in the small ducts while much of the energy of charging the ions returns to the circuit as energy that has not been dissipated. The ducts are kept very narrow for the very purpose of keeping the field close to the wire and the intensity of ion concentrations as high as possible so that there will be as much electric pressure or voltage and current to return to the circuit on each alternate half cycle as is possible. This is because the more ions of either sign are allowed to move outwards the less will be the voltage for any given number of them and consequently the less voltage there is to return to the circuit in the form of voltage-amperage-reactive. For any given reaction when chemical products are formed because for instance during one-half cycle there was a high concentration of reactive positive ions the reacted product will still have a high net positive charge and consist of positive ions, albeit of different chemical composition, which can be discharged as a condenser plate is discharged and recharged in a capacitive reactive A.C. circuit. The D.C. bias is added to the circuit should a charging to high opposite sign potential cause the desired chemical product to dissociate.

The invention further resides in features of construction, combination and arrangement herein disclosed and claimed.

For a more detailed understanding of the invention and for illustration of embodiments thereof, reference is made to the accompanying drawings.

FIG. 1a of the drawings illustrates the four basic elements of the reactor cell. No. 1 of this figure is the basic reaction tube through which extends 2, which is a very fine wire. The size of the duct extending through tube 1 must be kept very small in that the ions to be produced by ionizing wire 2 will lose the voltage and field strength they have by being confined to a narrow area if they are allowed to expand outward and as a consequence will have less voltage to restore to the circuit later. The diameter of tube 1 varies with the breakdown strength of the material of which it is constructed as well as with the applied voltage and the intensity of the field that is desired. The diameter of the inside duct of tube 1 produced favorable results in terms of achieving a low power factor of less than four percent when the duct measured .06 inch and the wire used was No. 36. No. 3 is the sleeve of conductive material which in conjunction with wire 2 across the dielectric of tube 1 causes electric capacitance which will exist in a capacitive reactance circuit. No. 4 is the combination of 1, 2 and 3 and it comprises the basic reaction chamber in that ions are formed and chemicals react in the duct through the center of No. 1 by the combined action of ionization as well as by the return of significant current from the ions to the capacitive reactance circuit when the ions are discharged. Consequently No. 4 is also to be considered a condenser of two values, having one value when measured on a capacitance reactance bridge at voltages of less than one volt and having another much larger capacitance when measured with ionized gases filling the duct at voltages over ten kilovolts. The second capacitance due to the ions may be forty times the former due to the wire alone. This is true when the wall of the tube No. 1 is very thin and has a very high breakdown voltage and when sleeve 3 fits very closely over No. 1. Since the maximum capacitance of this reaction chamber can be measured experimentally by filling the duct with a conductive solution and since the measured capacitance of the reaction chamber with gaseous ions filling the duct is very close to this figure, the chamber may be considered electrically as a capacitor with one plate composed partly of gaseous ions which will later be represented in the diagram of electric circuitry in FIG. 1c by No. 4.

In FIG. 1b there is represented an array of reaction chambers 4 with the tubes 1 and ducts together with ionization wires 2 extending beyond the two mounting discs 5.

In FIG. 1c is depicted the above array enclosed in housing 6 with annex chamber 7 and retrieving chamber 8 similar to 7 at the top of 6 with No. 9 depicting covers and connections for annex and retrieving chambers which covers are the same size.

In FIG. 1d, No. 1 represents a high voltage A.C. transformer capable of output of ten kilovolts or more and a frequency of up to 6000 cycles per second.

No. 2 of this figure is a D.C. power supply adjusted so that its voltage is one-half the output voltage of the peak voltage of 1.

No. 3 of this FIG. 1d is a variable inductive reactor and is optional as an additional embodiment to the basic inventive concept to keep the amperage of the entire circuit from leading the voltage excessively. Since the efficiency of the circuit in terms of the cost of electricity is determined by a wattmeter which does not read for charge the voltage-amperage-reactive current flow but only consumed power and this consumed power is not determined by the amperage flowing back and forth and therefore is not in proportion to electrons moved nor to ions formed or reacted in 4 but only by power consumed in doing the work of ionizing it is not necessary from an economic standpoint to keep reactances balanced. But this optional feature is useful to keep the voltage high. No. 4 is the array of reaction chambers which by their design described above behave electrically more like an electric condenser in producing capacitive reactance than like resistors with the effect that the power consumed in producing the ions relative to the number of ions produced with subsequent return of the charge to the circuit is represented by a power factor of four percent and can be brought lower as stronger and thinner dielectrics are available and as ionization wire sizes are decreased.

The effectiveness of this device is based upon the electrical efficiency founded upon retaining charge and voltage intensity in the narrow ducts and returning this to a capacitive-reactance circuit as a condenser does as well as upon the chemical theory which by way of example can be described as follows. The static electric forces in the nucleus of atoms attract negatively charged electrons into close orbit around themselves and atomic nucleus can be held close to other nucleus in chemical bonds because while nucleus of atoms might mutually repel each other by their like positive static electric forces they can be held in a bond by their mutual attraction for the opposite charges. If the static electric forces of any atom or group are balanced and form a tightly bound closed system they are relatively unreactive and have no tendency to interchange or share oppositely charged electrons. But if they lose electrons from their low energy, tightly bound state they have more of a tendency to mutually attract and share the fewer electrons that remain between them. The electrons of the nitrogen molecule are strongly bound and held close to the centers in a molecular system. Hydrogen molecules and especially atoms are tightly bound but if electrons are drawn away by an outside field and by collision impact the remaining very small hydrogen nucleus will attract and share electrons with the nitrogen atom. To say this another way the energy it takes to disassociate $H_2$ to $H+H$ is 52 kilocalories per gram atomic weight and another three hundred and fourteen kilocalories to ionize or take away the electrons from a grams worth of hydrogen atoms and since this is much more energy than it takes to disassociate an equal number of nitrogen atoms the hydrogen nuclei will share electrons in the orbits of the nitrogen atoms. However the resulting ammonia and other products will still be positive ions with positive static electric forces and when these are produced in the reaction chamber of this invention they will consequently react the way that a positive plate of a condenser does when its in a capacitance reactive circuit that is to say in discharging to help continue the current movement of the voltage amperage-reactive-current.

I claim:

1. A cell for the reaction of chemical elements or compounds in the gaseous state which comprises:
   (a) an annex gas feed chamber opening into several very small ducts which each contain an ionization wire, said ducts being formed of highly electrically insulating plastic or ceramic material and enclosed in a cylindrical sleeve of electrically conductive material,
   (b) means for applying a high positive voltage as D.C. bias to said wire,
   (c) means for maintaining an A.C. voltage having a potential of at least about ten kilovolts across said wire and sleeve such that the wire will not go beyond ground potential to have a charge on the wire opposite the sign determined for the particular reaction, and
   (d) a retrieving chamber with exhaust ports for receiving the exit into said ducts, said retrieving chamber positioned oppositely of said annex chamber.

2. A cell for the reaction of chemical elements or compounds in the gaseous state which comprises:
   (a) an annex gas feed chamber opening into several very small ducts which each contain an ionization wire, said ducts being formed of highly electrically insulating plastic or ceramic material and enclosed in a cylindrical sleeve of electrically conductive material,
   (b) means for applying a high negative voltage as D.C. bias to said wire,
   (c) means for maintaining an A.C. voltage having a potential of at least about ten kilovolts across said wire and sleeve such that the wire will not go beyond ground potential to have a charge on the wire opposite the sign determined for the particular reaction, and
   (d) a retrieving chamber with exhaust ports for receiving the exit into said ducts, said retrieving chamber positioned oppositely of said annex chamber.

3. A cell as claimed in claim 2 further comprising:
   (d) an inductive reactor as means of resonating with the capacitance across said cell, said reactor being in series connection between the power supply and the cell and of such reactance tuning as to achieve the most favorable power factor for highest efficiency.

References Cited

UNITED STATES PATENTS

| 1,845,670 | 2/1932 | Lebrun | 204—320 |
| 3,455,803 | 7/1969 | Miller | 204—312 X |
| 3,421,988 | 1/1969 | Rochow | 204—164 |

GERALD L. KAPLAN, Primary Examiner

T. TUFARIELLO, Assistant Examiner

U.S. Cl. X.R.

204—164, 177